(No Model.) 4 Sheets—Sheet 1.

J. KAYLOR.
CONVERTIBLE CORN PLANTER.

No. 555,319. Patented Feb. 25, 1896.

Witnesses:
Wm. M. Rheem.
H. M. Richards.

Inventor:
John Kaylor,
By W. B. Richards,
Atty.

(No Model.)   4 Sheets—Sheet 2.
J. KAYLOR.
CONVERTIBLE CORN PLANTER.
No. 555,319.   Patented Feb. 25, 1896.
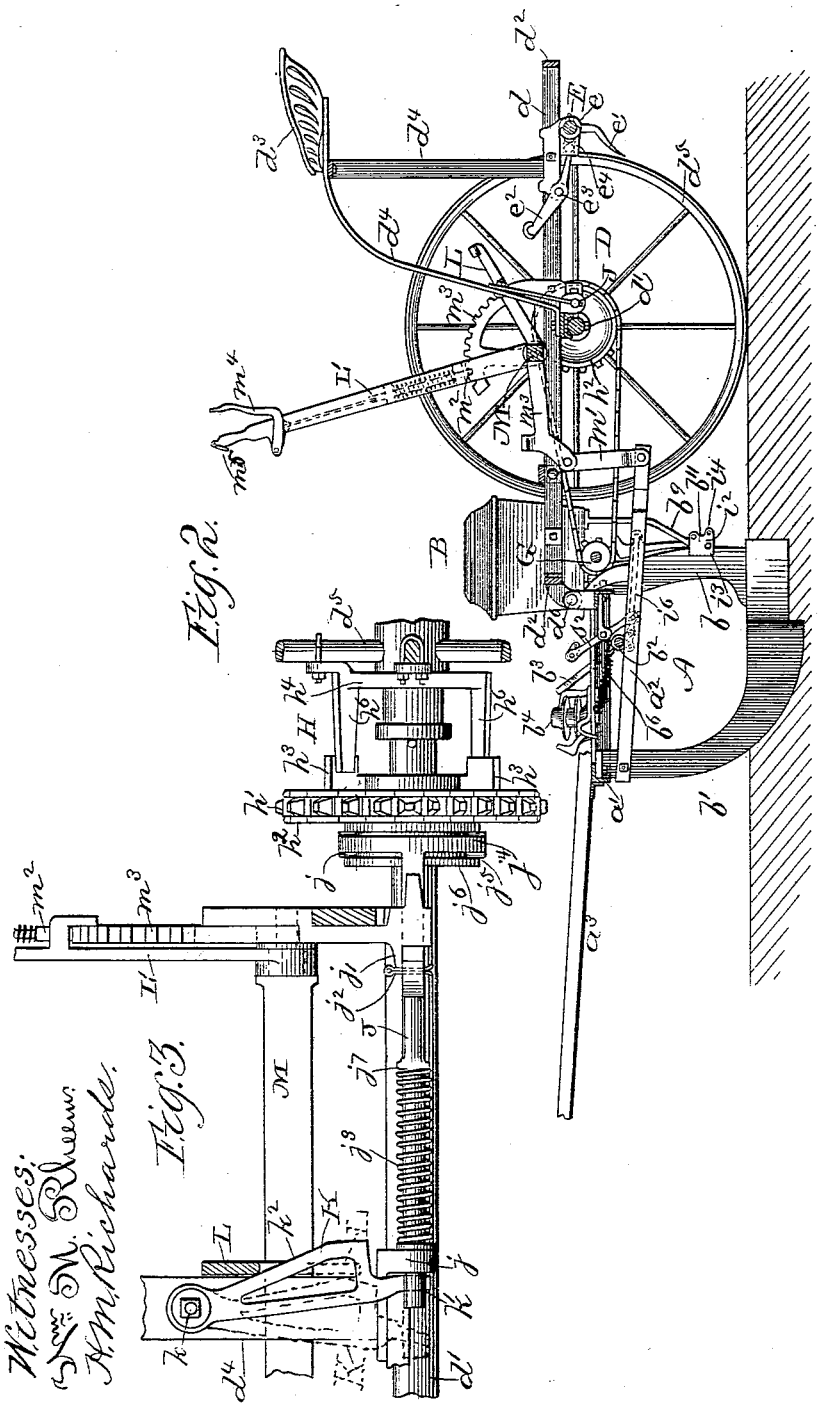

(No Model.) 4 Sheets—Sheet 3.

J. KAYLOR.
CONVERTIBLE CORN PLANTER.

No. 555,319. Patented Feb. 25, 1896.

Witnesses:
Wm. W. Rheem.
H. M. Richards.

Inventor:
John Kaylor,
By W. B. Richards,
Atty.

(No Model.) 4 Sheets—Sheet 4.

J. KAYLOR.
CONVERTIBLE CORN PLANTER.

No. 555,319. Patented Feb. 25, 1896.

Witnesses:
Wm. M. Rheem.
H. M. Richards.

Inventor,
John Kaylor,
By W. B. Richards,
Atty.

UNITED STATES PATENT OFFICE.

JOHN KAYLOR, OF DECATUR, ILLINOIS.

CONVERTIBLE CORN-PLANTER.

SPECIFICATION forming part of Letters Patent No. 555,319, dated February 25, 1896.

Application filed April 27, 1895. Serial No. 547,347. (No model.)

*To all whom it may concern:*

Be it known that I, JOHN KAYLOR, a citizen of the United States, residing at Decatur, in the county of Macon and State of Illinois, have invented certain new and useful Improvements in Convertible Corn-Planters, of which the following is a specification.

This invention relates to improvements in corn-planters.

A main object of the invention is to provide a convertible planter which can be used for drill-planting, as a cumulative drop-planter or planter in which the grains of seed are dropped singly from a seed-cup disk actuated by a planter wheel or wheels to the lower valve or valves, which lower valve or valves are actuated by a check-rower line to discharge the grains of seed in accumulated quantities as desired for planting in check-rows, and also as a check-rower planter for dropping the seed in charges for hills from a seed-cup disk operated by a check-rower line to the lower valve or valves, also actuated by the check-rower line, for discharging them in check-rows.

Another main object of my invention is to provide improved means for throwing the seed-cup disks out of gear with the wheel or wheels which operate them when the rear frame of the planter is tilted to raise the runners of the forward frame above the surface of the soil, and vice versa.

In carrying out these main objects of my invention different improvements have been evolved, the nature of which improvements and in what they consist will be hereinafter fully described, and the different combinations embodied therein form the subject-matter of the claims hereto appended.

In the accompanying drawings all my improvements are shown as embodied in the best way now known to me. Obviously, however, while still within the purview of my invention some of these improvements may be used without the others, and in planters differing in construction and organization from the planter shown by said drawings, in which—

Figure 1:
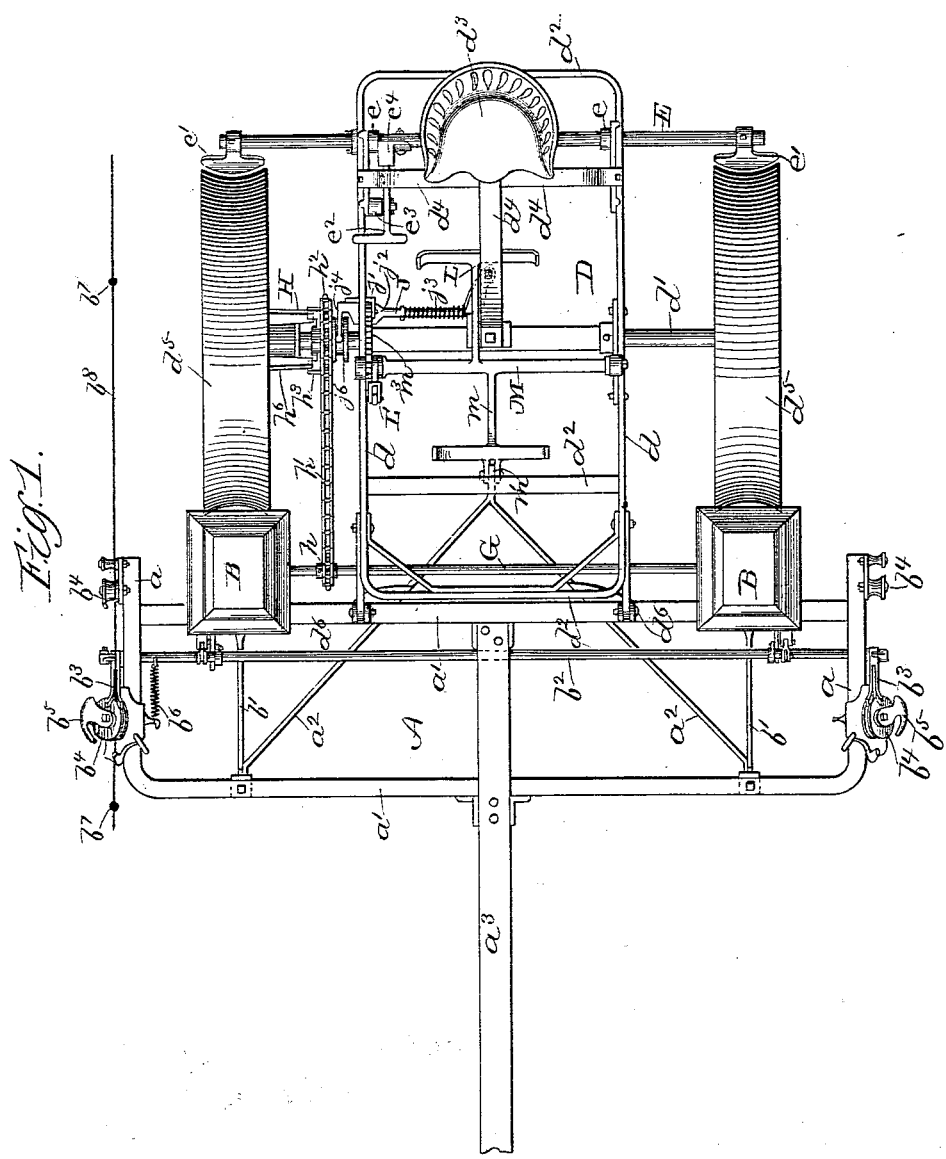
Figure 4:
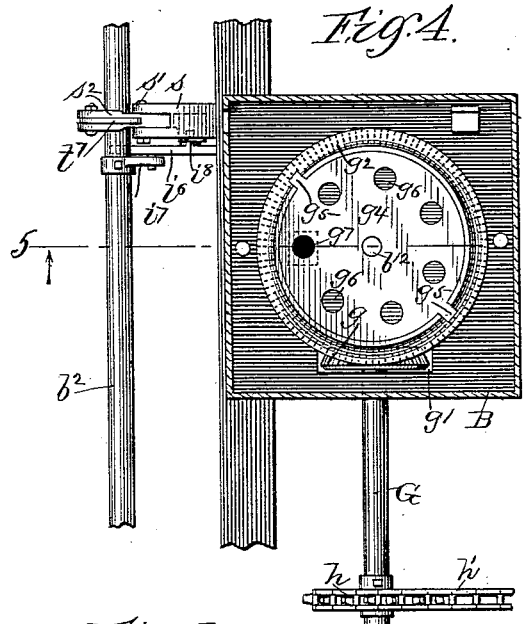
Figure 6:
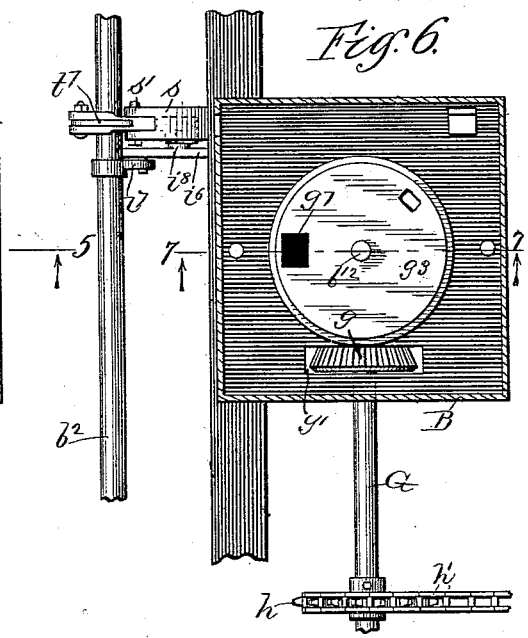
Figure 5:
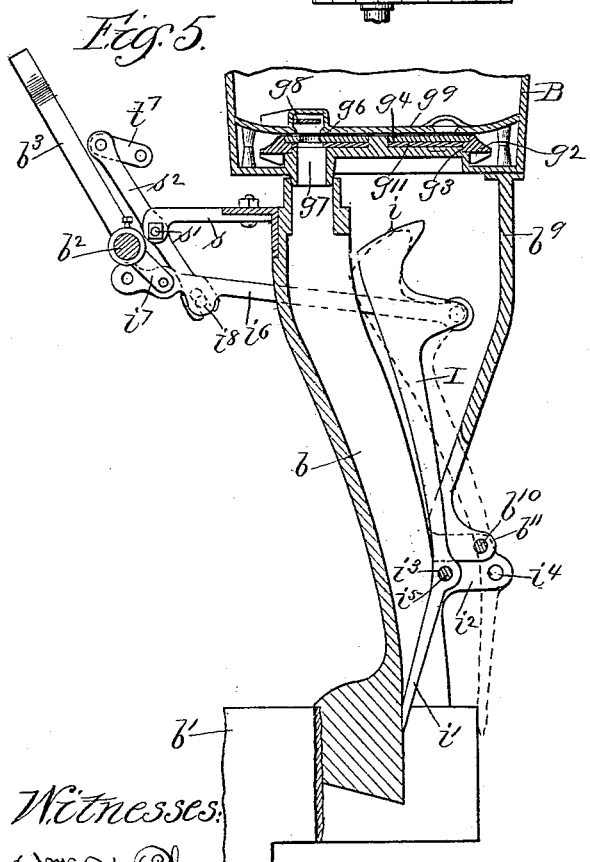
Figure 7:
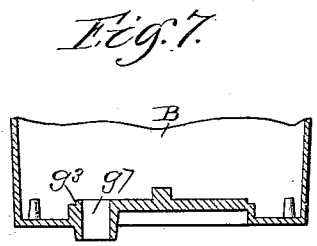
Figure 8:
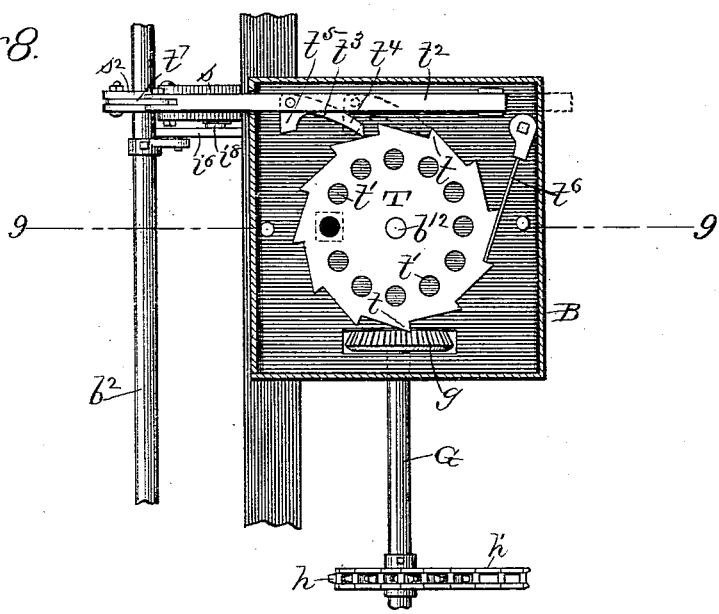
Figure 9:
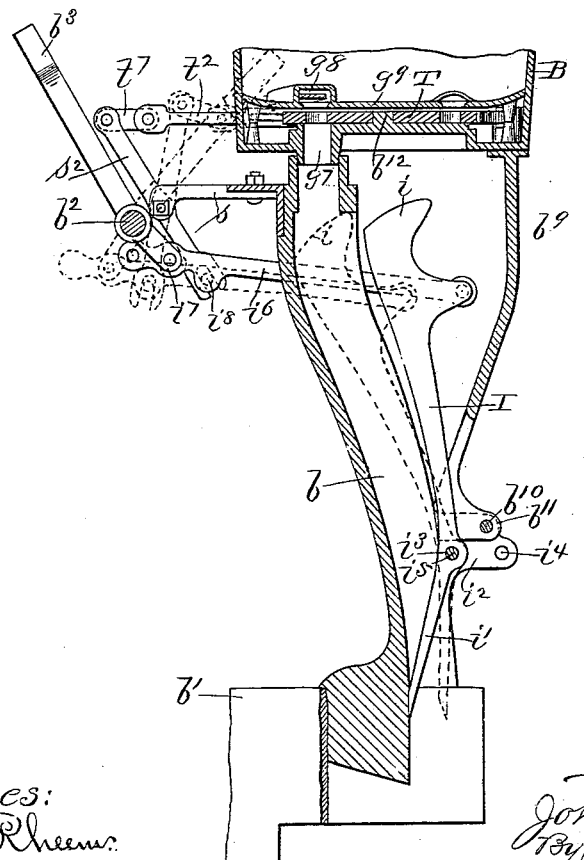

Figure 1 is a top plan of a corn-planter embodying my improvements; Fig. 2, a vertical sectional elevation of the planter shown as when used for drill-planting; Fig. 3, an enlarged rear elevation of the mechanism for throwing the seed-cup plates into and out of gear connection with the planter wheel or wheels by the operation of oscillating the lever to raise and lower the forward frame; Fig. 4, an enlarged sectional plan of one of the seed-boxes with the drill-plate and annulus or ring which carries it in place and plan of adjacent parts; Fig. 5, an enlarged sectional elevation in the line 5 5 in Fig. 4 of part of a seed-box, drill-plate, and annulus which carries it mounted therein, and of the seed-tube and part of the runner and elevation of the lower valves and mechanism for actuating said lower valves alone by the check-rower line; Fig. 6, an enlarged plan of same parts shown at Fig. 4, except that in Fig. 6 the drill-plate and annulus or ring which carries it are removed; Fig. 7, an enlarged sectional elevation of part of the seed-box; Fig. 8, an enlarged sectional plan of a seed-box with a seed-cup disk mounted therein, and top plan of mechanism for actuating same to drop charges of seed for check-row planting; also top plan of other adjacent parts; Fig. 9, an enlarged sectional elevation of part of a seed-box with the dropping-disk of Fig. 8 and an ordinary cap-plate and cut-off mounted therein, and of the seed-tube and part of the runner and elevation of the lower valves and mechanism for actuating the dropping-disk and the lower valves by means of the check-rower line.

The planter shown is one of an ordinary class, having a forward frame, A, consisting of side bars $a$, transverse bars $a'$, oblique bars $a^2$, and tongue $a^3$ fixed to said frame. This frame A supports the seed-boxes B, seed-tubes $b$, runners $b'$, rock-shaft $b^2$ provided with forked levers $b^3$, guide-pulleys $b^4$, check-row-line doffer $b^5$, and spring $b^6$ for returning the rock-shaft $b^2$ after it has been acted on in the ordinary manner by the tappets $b^7$ of the check-rower line $b^8$. The forward frame shown is of ordinary construction, except that the transverse bars $a'$ are extended and carry the side bars $a$ in proper position to support the guide-pulleys for the check-rower line and other parts of the check-rower device without any auxiliary check-rower head, and thus simplify the construction, and further differs from the ordinary forward frame in that but one rear transverse bar is used, and the further support thereby required for the seed-boxes is provided by a brace-bar $b^9$ at each seed-box, which is fixed at its upper end to the bottom of the seed-box and at its lower end by a bolt or bolts $b^{10}$ to a bracket $b^{11}$, which projects from the rear side of the adjacent seed-tube $b$.

The wheel-frame or rear frame, D, is of ordinary construction, consisting of side frame-bars $d$ rigidly fixed to the axle $d'$, transverse bars $d^2$, supporting the driver's seat $d^3$ by standards or bars $d^4$, and supported by wheels $d^5$, which are journaled on the ends of the axle $d'$. The ends of the side bars $d$ are extended and are hinged or journaled by bolts $d^6$ to the rear transverse bar of the forward frame, so that the forward frame may be raised and lowered on the axis of the axle by oscillation of the rear frame in a vertical plane in an ordinary manner.

The scraper-bar E is journaled in bearings $e$ to the rear part of the rear frame and carries the ordinary scrapers $e'$. A foot-pedal $e^2$, journaled at its mid-length part on a bracket $e^3$, which projects from a rear side frame-bar, rests loosely at its rear end in a socket in the forward end of a bracket $e^4$, which projects forwardly from the scraper-bar E, and thus forms a hinge to permit of the scrapers being forced against the wheels by pressure on the foot-pedal by the driver's foot. The scrapers are released from the wheels by their own gravity.

A shaft G, journaled in suitable bearings, extends across the planter and carries at each of its ends a bevel-pinion $g$, each of which projects through an opening $g'$ in the bottom of a seed-box, Figs. 4 and 6. An annulus-shaped bevel-gear pinion $g^2$, seated to rotate on a circular shoulder $g^3$ in each seed-box, Figs. 5, 6 and 7, gears with the bevel-pinion $g$ beneath. The drilling-disk $g^4$, Figs. 4 and 5, is removably fixed to the annulus-shaped pinion-wheel $g^2$ by means of radial lugs $g^5$, which rest in corresponding notches in said pinion $g^2$, Fig. 4. The drilling-disk $g^4$ has the ordinary circular series of seed-cups $g^6$, which successively register with and discharge their contained grains of seed through the opening $g^7$ in the bottom of the seed-box, which opening is beneath the cut-off $g^8$ carried by the cap $g^9$, Fig. 5.

A sprocket-wheel $h$, fixed on the shaft G, is geared by means of a sprocket-chain $h'$ with a sprocket-wheel $h^2$, which rotates with the axle $d'$, on which it is loosely mounted on the axle to revolve thereon and to slide back and forth lengthwise thereof. The sprocket-wheel $h^2$, with its laterally-projecting lugs $h^3$, forms one member of a clutch H, the other member of which consists of a plate $h^4$, bolted to one of the wheels $d^5$, and which has lugs $h^6$ projecting laterally therefrom. While these two members of the clutch are engaged, the rotating wheel $d^5$ will by means of its intermediate gear with the drilling-disk $g^4$ impart a constant rotary motion to said disk, and thereby effect a dropping of seed at short distances apart and in what is termed "drill-planting." This method of drill-planting is old and is not claimed herein.

For purposes hereinafter described a lower or seed-tube valve I is used, Figs. 5 and 9. This valve I is of that class having an upper laterally-extended end, $i$, which acts in an ordinary manner to collect, retain, and discharge seed to the lower end, $i'$, which is adapted to discharge them near the lower end of the seed-tube, also in an ordinary manner, which need not be any more fully described herein than to state that the bracket $i^2$, to which the valve I, or valves I, as they may more properly be termed, has two holes $i^3$ $i^4$ for the pivot-bolt $i^5$, on which the valve oscillates. When the pivot-bolt $i^5$ is seated in the hole $i^3$, then the valves $i$ $i'$ act in an ordinary manner for check-row planting, and when used for drill-planting, as hereinbefore described, the bolt $i^5$ is adjusted and seated in the hole $i^4$, whereby it will hold the valve I in the position shown by dot lines at Fig. 5, in which position it will not close the seed-tube either at its upper or at its lower end, as operated by the check-rower line in the manner hereinafter described, and hence will permit the seed to fall from the drill disk or plate to their place of deposit in the soil.

A bolt or rod J, Fig. 3, is seated in bearings $j$ $j'$ in such manner that it can slide back and forth lengthwise of itself to an extent limited in one direction by the swinging cam K, which moves it in that direction, and in the opposite direction by a pin $j^2$, which comes in contact with the bearing $j'$. Between the bearing $j$ and a shoulder $j^7$ on the bolt J the bolt is encircled by a coiled spring $j^3$, and the outer end of the bolt J carries a fork $j^4$, which rests loosely in a groove $j^5$ in the boss or hub $j^6$ of the slidable sprocket-wheel $h^2$. The sprocket-wheel $h^2$ and its clutch are normally pressed toward the clutch member carried by the wheel by means of the spring $j^3$, and said sprocket-wheel is thereby kept in operative connection with the planter-wheel until released from such operative connection, when the foot-lever L or hand-lever L' is oscillated to raise the forward frame and runner above the surface of the soil as follows:

Forward of the axle a rock-shaft M, Figs. 1, 2 and 3, is journaled in bearings to the side frame-bars $d$. From the forward side of the rock-shaft M an arm $m$ projects, the forward end of which is pivotally connected by means of a link $m'$ with the rear convergent ends of the bars $a^2$ of the forward frame. The foot-lever L projects rearwardly and upwardly from the rock-shaft M, and the hand-lever L' projects upwardly therefrom. The hand-lever is provided with the ordinary dog $m^2$, actuated in one direction for engagement with the curved rack-bar $m^3$ by the ordinary spring, and in an opposite direction for disengagement therefrom by the thumb-lever $m^4$, and is also provided with an ordinary link $m^5$ for engaging the thumb-lever and holding the dog $m^2$ out of operative engagement with the curved rack-bar. The foot-lever L projects rearwardly beyond the forward seat-supporting bar $d^4$, Figs. 2 and 3, and in close proximity thereto. The swinging cam K is by a bolt $k$ pivotally connected at its upper end to the forward seat-supporting bar $d^4$ and at its lower end passes loosely through a slot $k'$ in the rod or bolt J. The spring $j^3$ in holding the bolt J in its normal position thereby holds the cam K in its normal position, as shown best by full lines at Fig. 3, with its inclined side or cam-faced side $k^2$ projecting laterally beyond the bar $d^4$ and in such position that when, by force applied to either the hand-lever or the foot-lever to raise the forward frame with its runners above the surface of the ground the foot-lever is thereby lowered, it will by contact with the cam-face $k^2$ as lowered force the swinging cam K laterally, as shown by dot lines at Fig. 3, and thereby retract the bolt J, release the clutch mechanism H, and thereby release the dropping-disk from operative connection with the wheel $d^5$. Locking the hand-lever by means of the dog $m^2$ will hold the parts in the position last described. When the foot-lever is raised to lower the forward frame to work, the cam K will be released, and the spring $j^3$ will then force the bolt J in an opposite direction and thereby engage the clutch mechanism H and bring the dropping-disk again into operative connection with the wheel $d^5$.

It will be evident that the means herein described for throwing the dropping-disk into and out of gear connection with the planter-wheel by the operation of the foot-lever in raising and lowering the forward frame may be applied to any ordinary planter having a forward and a rear frame hinged to each other. The disk $g^4$ may be thickened at its central part, or a spacing-disk $g^{11}$, Fig. 5, be placed beneath it to hold it in proper position.

The cumulative drop-planter, which is so readily and easily convertible into a drill-planter by simply omitting the check-rower line and pivoting the lower valve in the rear hole $i^4$, as hereinbefore described, will now be more fully described in the matter of its operation and of the construction and arrangement of some of its parts, and also in the matter of its provision for the operative connection therewith of a seed-cup disk operated by the check-rower line, which also operates the lower valve or valves.

The bolt $i^5$ to render the valve I operative is adjusted in the hole $i^3$. The upper end part of the valve I, Fig. 5, is connected by a link-rod $i^6$ with a short radius-arm $i^7$, which projects from the rock-shaft $b^2$. In operation as a cumulative check-row drop the drill disk or plate $g^4$, Figs. 4 and 5, is operated by its gear connection with a planter-wheel $d^5$ in same manner as when used as a drill-planter, as hereinbefore described. The grains of seed falling from the drill-disk accumulate in sufficient quantity for a hill of seed on the lower end, $i'$, of the valve I, from which they are discharged for deposit in the soil by means of the forked lever $b^3$ coming in contact with one of the tappets $b^7$ on the check-rower line $b^8$, and thereby throwing the lower end of the valve I outwardly and its upper end, $i$, inwardly to the positions shown by dot lines at Fig. 9. Inasmuch as the drill-disk is continually operating, seed dropped by it while the lower valve is held open at its lower end by the forked lever being held temporarily in its rear position, as shown by dot lines at Fig. 9, would escape therethrough were it not prevented doing so by being checked and held by the upper end, $i$, of the valve I, which is at the same time in the position shown by dot lines at same figure.

By the means described planting will be effected in check-rows for cultivation crosswise of the path of the planter as well as paralleling the same. The further operation of the check-rowing mechanism need not be more fully herein described, as it will be understood by any person skilled in this art.

The link-rod $i^6$ of the cumulative dropper last described is provided with a stud-pin $i^8$, Figs. 4, 5, 6, 8 and 9, and the seed-tube with a bracket-arm $s$, having a stud-pin $s'$ on its outer end for receiving and operating an oscillating lever $s^2$, by means of which an ordinary dropping-disk T, mounted in the seed-box, may be operated by the check-rower line, which at the same time also operates the lower valve, and thereby interchangeable systems of dropping seed be used. For this interchange the dropping-disk $g^4$, spacing-disk $g^{11}$, and the annular pinion $g^2$ are removed and a seed-cup disk T, Figs. 8 and 9, placed over the stud $b^{12}$. The disk T is of that class shown in Letters Patent No. 340,511, issued to me April 20, 1886, for a check-row corn-planter, having ratchet-teeth $t$ about its circumference and an ordinary circular series of seed-cups $t'$. When mounted in the seed-box the disk T is held above and not in contact with the pinion $g$.

The disk T is operated or given an intermitting rotary motion in same manner as in my aforesaid patent—that is, by a slidable bar $t^2$ having a spring-actuated pawl $t^3$ with a push-pawl end $t^4$ and a detent end $t^5$ in connection with a detaining-spring $t^6$. The slide-bar $t^2$ is pivotally connected by a short link $t^7$ with the upper end of the lever $s^2$. The lever $s^2$ is pivotally mounted at its mid-length portion on the stud-pin $s'$, and its lower bifurcated end is seated astride the stud-pin $i^8$, whereby the link-rod $i^6$ will, simultaneously with its own movements derived from the forked lever and the tappets on the check-rower line, impart movements to the slide-bar $t^2$ and through it operate the seed-cup disk T in an ordinary manner and as shown and described in my aforesaid patent. By these means the dropping-disk T, which measures and drops charges of seed for a hill, is operated by the check-rower line, which at the same time also operates the lower valve, I, and thus check-row dropping is effected entirely through the instrumentality of the check-rower line and its connection with the disk T and lower valve, I, and without any of the parts of the dropping mechanism being operated by the planter-wheel. While the lower end, $i'$, of the valve I is open its upper end is closed, as shown by dot lines at Fig. 9, and will detain any seed that may fall from the disk T while the lower end of the valve I is thus open until said valve is swung to close its lower end, when its upper end will be opened and drop any seed retained thereon to the now closed lower end, $i'$. By this means seed is prevented from being dribbled or dropped irregularly between the hills of seed.

When the machine is used as a check-row planter operated entirely by the check-row line, the sprocket-chain $h'$ may be removed, or it may be left in place, as its rotation of the pinions $g$ will not affect the operation of the seed-cup disk T, with which these pinions are not in gear nor in contact.

When the check-rower disk T is removed, the spring $t^6$ and pawl $t^3$ are also removed before placing the drill-disk $g^4$ in position.

Having thus described my invention, what I claim as new, and desire to secure by Letters Patent, is—

1. In a corn-planter having a rear frame supported on wheels, a forward frame hinged to said rear frame and provided with seed-boxes, seed-dropping disks, and runners, or furrow-openers, and in combination therewith; a sprocket-wheel geared with to operate the dropping-disks, a clutch mechanism for gearing said sprocket-wheel with a planter-wheel, a clutch-shipping rod, a swinging cam K pivoted to a seat-supporting bar, and a foot-lever mounted on a rock-shaft in such relation to said swinging cam that it will contact therewith when lowered to raise the forward frame of the planter with its runners above the ground, and thereby operate the clutch-shipping rod, substantially as described and for the purpose specified.

2. In a corn-planter having a rear frame supported on wheels, a forward frame hinged to said rear frame and provided with seed-boxes, seed-dropping disks, and runners or furrow-openers, and in combination therewith; a sprocket-wheel geared with to operate the dropping-disks, a clutch mechanism for gearing said sprocket-wheel with a planter-wheel, a clutch-shipping rod, J, connected with one member of the clutch, a spring $j^3$ a swinging cam K, a rock-shaft, M, having an arm $n^3$ connected with the forward frame, a locking hand-lever L' fixed thereto, and a foot-lever L also fixed thereto and in such relation to the cam K that when the foot-lever is lowered to raise the forward frame it will contact with said cam, substantially as and for the purpose specified.

3. In a corn-planter substantially such as described, having a drilling-disk in the seed-box operated by the planter-wheel, and a seed-cumulating valve in the seed-tube operated by a check-rower line, a bracket $i^2$ with two holes for the pivotal bolt of the valve in the seed-tube, whereby said valve may be adjusted in operative position in one of said holes when the planter is used for check-rowing, and in inoperative position in the other of said holes when the planter is used as a drill, substantially as described and for the purpose specified.

4. In a convertible planter substantially such as hereinbefore described, having a lower valve operated by a link-rod connection with a radius-arm from the rock-shaft having forked levers that are actuated by tappets on a check-rower line, a rocking lever $s^2$ pivotally mounted on a bracket-arm, pivotally connected with said link-rod, and adapted for connection with a slidable bar which actuates a substitutive seed-cup disk in the seed-box which disk drops full charges of seed, whereby the seed-cup disk in the seed-box and the valve in the seed-tube are both operated by the check-rower line, substantially as described.

5. In a convertible planter substantially such as hereinbefore described, having a lower valve operated by a link-rod connection with the rock-shaft having forked levers actuated by the check-rower line, a supplemental rocking lever, $s^2$ actuated by the check-rower mechanism, and provided with means for connecting its upper end with the seed-cup disk $g^4$ substituted for the one operated by the wheel of the planter, substantially as described.

In testimony whereof I affix my signature in presence of two witnesses.

JOHN KAYLOR.

Witnesses:
R. J. SIMPSON,
J. FRANK DAVIS.